United States Patent [19]
Obijeski et al.

[11] Patent Number: 5,395,471
[45] Date of Patent: Mar. 7, 1995

[54] HIGH DRAWDOWN EXTRUSION PROCESS WITH GREATER RESISTANCE TO DRAW RESONANCE

[75] Inventors: Todd J. Obijeski, Houston; Shih-Yaw Lai, Sugar Land; Rajen M. Patel, Lake Jackson; Lichih R. Peng, Lake Jackson; Michael F. Langohr, Lake Jackson; David C. Kelley; David A. Eversdyk, both of Angleton; Nicole F. Whiteman, Lake Jackson, all of Tex.

[73] Assignee: The Dow Chemical Company, Midland, Mich.

[21] Appl. No.: 84,054

[22] Filed: Jun. 29, 1993

Related U.S. Application Data

[63] Continuation-in-part of Ser. No. 776,130, Oct. 15, 1991, Pat. No. 5,272,236, and a continuation-in-part of Ser. No. 939,281, Sep. 2, 1992, Pat. No. 5,278,272, and a continuation-in-part of Ser. No. 55,063, Apr. 28, 1993.

[51] Int. Cl.$^6$ .............................................. B29C 47/02
[52] U.S. Cl. ............................ 156/244.11; 156/244.24; 526/348; 526/348.5
[58] Field of Search ..................... 156/244.11, 244.24; 526/127, 132, 150, 152, 160, 170, 336, 348, 348.2, 348.3, 348.4, 348.5, 348.6, 516

[56] References Cited

U.S. PATENT DOCUMENTS

| Re. 33,683 | 9/1991 | Allen et al. . |
|---|---|---|
| 3,247,290 | 4/1966 | Werkman et al. . |
| 3,371,464 | 3/1968 | Swick . |
| 3,456,044 | 7/1969 | Pahlke . |
| 3,491,073 | 1/1970 | Marinak . |
| 3,555,604 | 1/1971 | Pahlke . |
| 3,645,992 | 2/1972 | Elston . |
| 3,914,342 | 10/1975 | Mitchell . |
| 4,011,384 | 3/1977 | Baxmann et al. . |
| 4,076,698 | 2/1978 | Anderson et al. . |
| 4,205,021 | 5/1980 | Morita et al. . |
| 4,259,468 | 3/1981 | Kajiura et al. . |
| 4,302,566 | 11/1981 | Karol et al. . |
| 4,303,710 | 12/1981 | Bullard et al. . |
| 4,303,771 | 12/1981 | Wagner et al. . |
| 4,328,328 | 5/1982 | Minami et al. . |
| 4,339,493 | 7/1982 | Weiner . |
| 4,339,496 | 7/1982 | Weiner . |
| 4,339,507 | 7/1982 | Kurtz et al. . |
| 4,340,640 | 7/1982 | Weiner . |
| 4,340,641 | 7/1982 | Weiner . |
| 4,346,834 | 8/1982 | Mazumdar . |
| 4,348,346 | 9/1982 | Thompson . |
| 4,349,648 | 9/1982 | Jorgensen et al. . |
| 4,352,849 | 10/1982 | Mueller . |
| 4,354,009 | 10/1982 | Goeke et al. . |
| 4,359,495 | 11/1982 | Schroeder et al. . |
| 4,359,553 | 11/1982 | Edwards . |
| 4,359,561 | 11/1982 | Fraser et al. . |
| 4,363,904 | 12/1982 | Fraser et al. . |
| 4,365,044 | 12/1982 | Liu . |
| 4,367,256 | 1/1983 | Biel . |
| 4,370,456 | 1/1983 | George . |
| 4,378,451 | 3/1983 | Edwards . |
| 4,379,197 | 4/1983 | Cipriani et al. . |
| 4,380,567 | 4/1983 | Shigemoto . |

(List continued on next page.)

FOREIGN PATENT DOCUMENTS 2123747A 2/1984 United Kingdom .
9106426 5/1991 WIPO .

OTHER PUBLICATIONS

Roberts et al., ANTEC Proceedings '85, "New Process for the Reduction of Draw Resonance in Melt Embossing and Extrusion Coating", pp. 104–107.

(List continued on next page.)

Primary Examiner—Caleb Weston

[57] ABSTRACT

A process for extruding a thermoplastic composition at higher drawdown rates with less neck-in and greater resistance to draw resonance as well as processes for extrusion coating a substrate and for making an extrusion-cast film are disclosed. The thermoplastic composition is made of at least one substantially linear ethylene polymer used alone or in combination with at least one high-pressure ethylene polymer and/or with at least one heterogeneous linear olefin polymer.

19 Claims, 1 Drawing Sheet

U.S. PATENT DOCUMENTS

| | | |
|---|---|---|
| 4,383,095 | 5/1983 | Goeke et al. . |
| 4,387,185 | 6/1983 | Schroeder et al. . |
| 4,390,677 | 6/1983 | Karol et al. . |
| 4,399,180 | 8/1983 | Briggs . |
| 4,405,774 | 9/1983 | Miwa et al. . |
| 4,410,649 | 10/1983 | Cieloszyk . |
| 4,418,114 | 11/1983 | Briggs et al. . |
| 4,424,138 | 1/1984 | Candlin et al. . |
| 4,427,573 | 1/1984 | Miles et al. . |
| 4,427,833 | 1/1984 | Edwards . |
| 4,429,079 | 1/1984 | Shibata et al. . |
| 4,438,238 | 3/1984 | Fukushima et al. . |
| 4,438,243 | 3/1984 | Kashiwa et al. . |
| 4,452,958 | 6/1984 | Chester et al. . |
| 4,454,281 | 6/1984 | Heitz et al. . |
| 4,461,792 | 7/1984 | Anthony . |
| 4,463,153 | 7/1984 | Mizutani et al. . |
| 4,464,426 | 8/1984 | Anthony . |
| 4,467,065 | 8/1984 | Williams et al. . |
| 4,482,687 | 11/1984 | Noshay et al. . |
| 4,485,217 | 11/1984 | Gunter et al. . |
| 4,486,377 | 12/1984 | Lucchesi et al. . |
| 4,486,552 | 12/1984 | Neimann . |
| 4,486,579 | 12/1984 | Machon et al. . |
| 4,505,970 | 3/1985 | Craver . |
| 4,510,303 | 4/1985 | Oda et al. . |
| 4,513,038 | 4/1985 | Anthony . |
| 4,514,465 | 4/1985 | Schoenberg . |
| 4,519,968 | 5/1985 | Klaus et al. . |
| 4,526,919 | 7/1985 | Edwards . |
| 4,528,312 | 7/1985 | Edwards . |
| 4,530,914 | 7/1985 | Ewen et al. . |
| 4,532,189 | 7/1985 | Mueller . |
| 4,542,886 | 9/1985 | Yoshimura et al. . |
| 4,544,762 | 10/1985 | Kaminsky et al. . |
| 4,547,555 | 10/1985 | Cook et al. . |
| 4,551,380 | 11/1985 | Schoenberg . |
| 4,563,504 | 1/1986 | Hert et al. . |
| 4,564,559 | 1/1986 | Wagner . |
| 4,568,713 | 2/1986 | Hansen et al. . |
| 4,587,318 | 5/1986 | Inoue et al. . |
| 4,588,650 | 5/1986 | Mientus et al. . |
| 4,588,794 | 5/1986 | Oda . |
| 4,593,009 | 6/1986 | Nowlin . |
| 4,597,920 | 7/1986 | Golike . |
| 4,598,128 | 7/1986 | James et al. . |
| 4,599,391 | 7/1986 | Yamamoto et al. . |
| 4,599,392 | 7/1986 | McKinney et al. . |
| 4,608,221 | 8/1986 | Kurtz et al. . |
| 4,613,547 | 9/1986 | Wagner et al. . |
| 4,617,241 | 10/1986 | Mueller . |
| 4,618,662 | 10/1986 | Nowlin . |
| 4,624,991 | 11/1986 | Haas . |
| 4,626,467 | 12/1986 | Hostetter . |
| 4,626,574 | 12/1986 | Cancio et al. . |
| 4,629,771 | 12/1986 | Candlin et al. . |
| 4,640,856 | 2/1987 | Ferguson . |
| 4,649,001 | 3/1987 | Nakamura et al. . |
| 4,666,772 | 5/1987 | Schinkel et al. . |
| 4,666,999 | 5/1987 | Cook et al. . |
| 4,668,463 | 5/1987 | Cancio et al. . |
| 4,668,575 | 5/1987 | Schinkel et al. . |
| 4,668,650 | 5/1987 | Lo et al. . |
| 4,668,752 | 5/1987 | Tominari et al. . |
| 4,672,096 | 6/1987 | Nowlin . |
| 4,676,922 | 6/1987 | Sommer . |
| 4,677,087 | 6/1987 | Lo et al. . |
| 4,690,991 | 9/1987 | Seppl . |
| 4,690,992 | 9/1987 | Grubbs et al. . |
| 4,692,386 | 9/1987 | Schinkel et al. . |
| 4,710,538 | 12/1987 | Jorgensen . |
| 4,716,207 | 12/1987 | Cozewith et al. . |
| 4,719,193 | 1/1988 | Levine et al. . |
| 4,720,427 | 1/1988 | Clauson et al. . |
| 4,722,971 | 2/1988 | Datta et al. . |
| 4,724,185 | 2/1988 | Shah . |
| 4,732,882 | 3/1988 | Allen et al. . |
| 4,737,391 | 4/1988 | Lustig et al. . |
| 4,742,138 | 5/1988 | Kageyama . |
| 4,755,403 | 7/1988 | Ferguson . |
| 4,755,419 | 7/1988 | Shah . |
| 4,762,898 | 8/1988 | Matsuura et al. . |
| 4,764,549 | 8/1988 | Greenhalgh et al. . |
| 4,767,485 | 8/1988 | Michiels . |
| 4,775,710 | 10/1988 | Dunski et al. . |
| 4,780,264 | 10/1988 | Dohrer et al. . |
| 4,788,232 | 11/1988 | Needham . |
| 4,789,714 | 12/1988 | Cozewith et al. . |
| 4,792,595 | 12/1988 | Cozewith et al. . |
| 4,798,081 | 1/1989 | Hazlitt et al. . |
| 4,801,486 | 1/1989 | Quacquarella et al. . |
| 4,803,253 | 2/1989 | McDaniel et al. . |
| 4,808,635 | 2/1989 | Nguyen . |
| 4,820,557 | 4/1989 | Warren . |
| 4,820,589 | 4/1989 | Dobreski et al. . |
| 4,824,889 | 4/1989 | Mostert . |
| 4,826,939 | 5/1989 | Stuart . |
| 4,830,926 | 5/1989 | Mostert . |
| 4,833,017 | 5/1989 | Benoit . |
| 4,834,947 | 5/1989 | Cook et al. . |

(List continued on next page.)

U.S. PATENT DOCUMENTS

| | | |
|---|---|---|
| 4,842,187 | 6/1989 | Janocha et al. . |
| 4,842,930 | 6/1989 | Schinkel . |
| 4,842,951 | 6/1989 | Yamada et al. . |
| 4,857,611 | 8/1989 | Durand et al. . |
| 4,859,379 | 8/1989 | Chiang . |
| 4,863,769 | 9/1989 | Lustig et al. . |
| 4,863,784 | 9/1989 | Lustig et al. . |
| 4,865,902 | 9/1989 | Golike et al. . |
| 4,874,820 | 10/1989 | Cozewith et al. . |
| 4,876,321 | 10/1989 | Lo et al. . |
| 4,882,406 | 11/1989 | Cozewith et al. . |
| 4,883,853 | 11/1989 | Hobes et al. . |
| 4,886,690 | 12/1989 | Davis et al. . |
| 4,888,318 | 12/1989 | Allen et al. . |
| 4,892,911 | 1/1990 | Genske . |
| 4,921,920 | 5/1990 | Collomb-Ceccarini et al. . |
| 4,923,750 | 5/1990 | Jones . |
| 4,925,728 | 5/1990 | Crass et al. . |
| 4,927,708 | 5/1990 | Herran et al. . |
| 4,935,474 | 6/1990 | Ewen et al. . |
| 4,937,299 | 6/1990 | Ewen et al. . |
| 4,952,451 | 8/1990 | Mueller . |
| 4,957,790 | 9/1990 | Warren . |
| 4,959,436 | 9/1990 | Cozewith et al. . |
| 4,963,388 | 10/1990 | Benoit . |
| 4,963,419 | 10/1990 | Lustig et al. . |
| 4,963,427 | 10/1990 | Botto et al. . |
| 4,966,951 | 10/1990 | Benham et al. . |
| 4,967,898 | 12/1990 | Lustig et al. . |
| 4,968,765 | 11/1990 | Yagi et al. . |
| 4,975,315 | 12/1990 | Bolthe et al. . |
| 4,976,898 | 12/1990 | Lustig et al. . |
| 4,977,022 | 12/1990 | Mueller . |
| 4,981,760 | 1/1991 | Naito et al. . |
| 4,981,826 | 1/1991 | Speca . |
| 4,983,447 | 1/1991 | Crass et al. . |
| 4,987,212 | 1/1991 | Morterol et al. . |
| 4,988,465 | 1/1991 | Lustig et al. . |
| 4,996,094 | 2/1991 | Dutt . |
| 5,006,396 | 4/1991 | VanBortel et al. . |
| 5,006,398 | 4/1991 | Banerji . |
| 5,013,801 | 5/1991 | Cozewith et al. . |
| 5,015,511 | 5/1991 | Treybig et al. . |
| 5,015,749 | 5/1991 | Schmidt et al. . |
| 5,019,315 | 5/1991 | Wilson . |
| 5,024,799 | 6/1991 | Harp et al. . |
| 5,025,072 | 6/1991 | Nowlin et al. . |
| 5,026,798 | 6/1991 | Canich . |
| 5,032,463 | 7/1991 | Smith . |
| 5,041,316 | 8/1991 | Parnell et al. . |
| 5,041,584 | 8/1991 | Crapo et al. . |
| 5,041,585 | 8/1991 | Deavenport et al. . |
| 5,043,040 | 8/1991 | Butler . |
| 5,047,468 | 9/1991 | Lee et al. . |
| 5,055,328 | 10/1991 | Evert et al. . |
| 5,055,338 | 10/1991 | Sheth et al. . |
| 5,055,438 | 10/1991 | Canich . |
| 5,055,533 | 10/1991 | Allen et al. . |
| 5,055,534 | 10/1991 | Theobald . |
| 5,059,481 | 10/1991 | Lusting et al. . |
| 5,064,796 | 11/1991 | Speca . |
| 5,064,802 | 11/1991 | Stevens et al. . |
| 5,068,489 | 11/1991 | Edwards et al. . |
| 5,073,452 | 12/1991 | Satou et al. . |
| 5,073,599 | 12/1991 | Genske . |
| 5,075,143 | 12/1991 | Bekele . |
| 5,082,908 | 1/1992 | Imai et al. . |
| 5,084,039 | 1/1992 | Cancio et al. . |
| 5,084,540 | 1/1992 | Albizzati et al. . |
| 5,084,927 | 2/1992 | Parkevich . |
| 5,089,321 | 2/1992 | Chum et al. . |
| 5,106,545 | 4/1992 | Warren . |
| 5,106,688 | 4/1992 | Bradfute et al. . |
| 5,112,674 | 5/1992 | German et al. . |
| 5,206,075 | 4/1993 | Hodgson, Jr. . |
| 5,218,071 | 6/1993 | Tsutsui et al. . |
| 5,241,031 | 8/1993 | Mehta . |

OTHER PUBLICATIONS

Lucchesi et al., *Plastics Engineering*, "Reducing draw resonance in LLDPE film resins", pp. 87–90, May 1985.

*ANTEC Proceedings 1989*, "Resistance to Draw Resonance of Linear Low Density Polyethylene Through Improved Resin Design", pp. 28–30.

Randall, *ACS Symposium Series No. 142*, "Polymer Characterization by ESR and NMR", pp. 93–117 (1980).

M. Shida et al., *Polymer Engineering Science*, vol. 17, No. 11, "Correlation of Low Density Polyethylene Rheological Measurements with Optical and Processing Properties" pp. 769–774 (1977).

John Dealy, *Rheometers for Molten Plastics*, Van Nostrand Reinhold Co., pp. 97–99, (1982).

S. Lai et al., *ANTEC '93 Proceedings*, "Dow Constrained Geometry Catalyst Technology (CGCT)–New (List continued on next page.)

OTHER PUBLICATIONS

Rules for Ethylene α-Olefin Interpolymers–Controlled Rheology Polyolefins", New Orleans, La., pp. 1182–1192, (May 1993).

Ramamurthy, *Journal of Rehology*, "Wall Slip in Viscous Fluids and Influence of Materials of Construction", John Wiley & Sons, 30(2), pp. 337–357, (1986).

Wild et al., *Journal of Polymer Science, Poly. Phys. Ed.*, "Determination of Branching Distributions in Polyethylene and Ethylene Copolymers", John Wiley & Sons, vol. 20, p. 441 (1982).

Williams and Ward, *Journal of Polymer Science: Polymer Letters*, vol. 6, "The Construction of a Calibration Curve for Gel Permeation Chromatography using Polystyrene Fractions", pp. 621–627, (1968).

*Journal of Polymer Science*, Part A, vol. 1 (pp. 2869–2880 (1963)), "Long-Chain Branching Frequency in Polyethylene" by J. E. Guillet.

*Polymer Preprints, Amer. Chem. Society*, vol. 12, No. 1, pp. 277–281 (Mar. 1971), "Evidence of Long-Chain Branching in High Density Polyethylene" by E. E. Drott and R. A. Mendelson.

*Journal of the American Chemical Society*, 98:7, pp. 1729–1742 (Mar. 31, 1976) "Structure and Chemistry of Bis(cyclopentadienyl)–MLn Complexes" by Joseph W. Lauher and Roald Hoffman.

*Polymer Engineering and Science*, vol. 16, No. 12, pp. 811–816 (Dec. 1976), "Influence of Long-Chain Branching on the Viscoelastic Properties of Low-Density Polyethylenes" by L. Wild, R. Ranganath, and D. Knobeloch.

*Angew. Chem. Int. Ed. Engl.* pp. 630–632 (1976) vol. 15, No. 10, "Halogen-Free Soluble Ziegler Catalysts for the Polymerization of Ethylene. Control of Molecular Weight by Choice of Temperature" by Arne Andresen et al.

*Advances in Organometallic Chemistry*, pp. 99–148, vol. 18, (1980) "Ziegler–Natta Catalysis" by Hansjorg Sinn and Walter Kaminsky.

*Angew. Chem. Int. Ed. Engl.*, pp. 390–393, vol. 19 No. 5 (1980) "'Living Polymers' on Polymerization with Extremely Productive Ziegler Catalysts" by Hansjorg Sinn, Walter Kaminsky, Hans–Jurgen Vollmer, and Rudiger Woldt.

*Polymer Bulletin*, 9, pp. 464–469 (1983) "Halogen Free Soluble Ziegler Catalysts with Methylalumoxan as Catalyst" by Jens Herwig and Walter Kaminsky.

*Makromol. Chem., Rapid Commun.*, 4, pp. 417–421 (1983) "Bis(cyclopentadienyl)zirkon-Verbingungen und Aluminoxan als Ziegler-Katalysatoren fur die Polymerisation und Copolymerisation von Olefinen" by Walter Kaminsky et al.

*ANTEC Proceedings*, pp. 306–309 (1983), "Analysis of Long Chain Branching in High Density Polyethylene" by J. K. Hughes.

*Makromol. Chem., Rapid Commun.*, (5) pp. 225–228 (1984) "Influence of hydrogen on the polymerization of ethylene with the homogeneous Ziegler system bis(cyclopentadienyl)zirconiumdichloride/aluminoxane" by Walter Kaminsky et al.

*Journal of Polymer Science Polymer Chemistry Edition*, pp. 2117–2133 (1985) vol. 23, "Homogeneous Ziegler–Natta Catalysis. II. Ethylene Polymerization by IVB Transition Metal Complexes/Methyl Aluminoxane Catalyst Systems" by E. Giannetti and R. Mazzocchi.

*Journal of Applied Polymer Science*, pp. 3751–3765 (1985) vol. 30, "On the Effects of Very Low Levels of Long Chain Branching on Rheological Behavior in Polyethylene" by B. H. Bersted.

*Journal of Polymer Science: Polymer Chemistry Edition*, pp. 2151–2164 (1985) vol. 23, "Ethylene Propylene Diene Terpolymers Produced with a Homogeneous and Highly Active Zirconium Catalyst" by Walter Kaminsky et al.

*The Society of Rehology*, pp. 337–357 (1986) vol. 30, "Wall Slip in Viscous Fluids and Influence of Materials of Construction" by A. V. Ramamurthy.

*Makromol. Chem., Macromol. Symp.*, 4, pp. 103–118 (1986) "Elastomers By Atactic Linkage of α-Olefins Using Soluble Ziegler Catalysts" by W. Kaminsky and M. Schlobohm.

*Journal of Rheology*, 31 (8) pp. 815–834 (1987) "Wall Slip and Extrudate Distortion in Linear Low-Density Polyethylene" by D. Kalika and M. Denn.

*Makromol. Chem.*, 190, pp. 515–526 (1989) "Copolymerization of Cycloalkenes with Ethylene In Presence of Chiral Zirconocene Catalysts" by W. Kaminsky and R. Spiehl.

*Journal of Macromolecular Science: Reviews in Macromolecular Chemistry and Physics*, C29(2&3), pp. 201–303 (1989) "A Review of High Resolution Liquid [13]Carbon (List continued on next page.)

OTHER PUBLICATIONS

Nuclear Magnetic Resonance Characterizations of Ethylene-Based Polymers".

*Journal of Non-Newtonian Fluid Mechanics,* 36, pp. 255–263 (1990) "Additional Observations on The Surface Melt Fracture Behavior Of Linear Low-Density Polyethylene" by R. Moynihan, D. Baird, and R. Ramanathan.

*Makromol. Chem. Rapid Commun.,* pp. 89–94 (1990) "Terpolymers of Ethylene, Propene and 1,5-Hexadiene Synthesized with Zirconocene/Methylaluminoxane" by W. Kaminsky and H. Drogemuller.

*Journal of Rhelolgy,* 35(4), 3 (May, 1991) pp. 497–552, "Wall Slip of Molten High Density Polyethylene. I. Sliding Plate Rheometer Studies" by S. G. Hatzikiriakos and J. M. Dealy.

*Proceedings of the 1991 IEEE Power Engineering Society,* pp. 184–190 (Sep. 22–27, 1991), "New Specialty Linear Polymers (SLP) For Power Cables" by Monica Hendewerk and Lawrence Spenadel.

*Society of Plastic Engineers Proceedings,* Polyolefins VII International Conference Feb. 24–27, 1991, "Structure/Property Relationships in Exxpol TM Polymers" (pp. 45–66) by C. Speed, B. Trudell, A. Mehta, and F. Stehling.

*1991 Specialty Polyolefins Conference Proceedings*, "The Marketing Challenge Created By Single Site Catalysts in Polyolefins," Sep. 24, 1991, (pp. 41–45) by Michael P. Jeffries.

*High Polymers,* vol. XX, "Crystalline Olefin Polymers" Part 1, pp. 495–501.

*1991 Polymers, Laminations & Coatings Conference,* TAPPI Proceedings, presented in Feb., 1991, pp. 289–296, "A New Family of Linear Ethylene Polymers with Enhanced Sealing Performance" by D. Van der Sanden and R. W. Halle.

*Society of Plastic Engineers 1991 Specialty Polyolefins Conference Proceedings,* pp. 41–55, "The Marketing Challenge Created by Single Site Catalysts in Polyolefins" by M. Jeffries (Sep. 24, 1991).

*Advances In Polyolefins,* by R. B. Seymour and T. Cheng, (1987), pp. 373–380 "Crystallinity and Morphology of Ethylene α-Olefin Copolymers" by P. Schouterden, G. Groeninckx, and H. Reynaers.

*Advances In Polyolefins,* by R. B. Seymour and T. Cheng (1987) "New Catalysis and Process For Ethylene Polymerization", pp. 337–354, by F. Karol, B. Wagner, I. Levine, G. Goeke and A. Noshay.

*Advances In Polyolefins,* by R. B. Seymour and T. Cheng, (1987) "Polymerization of Olefins With A Homogeneous Zirconium/Alumoxane Catalyst", pp. 361–371 by W. Kaminsky and H. Hahnsen.

*ANTEC '92 Proceedings,* pp. 154–158 ("Exact TM Linear Ethylene Polymers for Enhanced Sealing Performance" by D. Van der Sanden and R. W. Halle).

*Society of Plastics Engineers,* Polyolefins VII International Conference, Feb. 24–27, 1991, "Structure/Property Relationships in Exxpol TM Polymers", pp. 45–66, Speed et al.

*ACS Symposium Series No.* 142, "Polymer Characterization by ESR and NMR", by Randall Williams and Word in *Journal of Polymer Science, Polymer Letters,* vol. 6 p. 621 (1968).

*Polymer Engineering and Science,* vol. 17, No. 11, 1977, "Correlation of Low Density Polyethylene Rheological Measurements with Optical and Processing Properties", Shida et al.

*Rheometers for Molten,* John Dealy, Van Nostrand Reinhold Co. (1982), pp. 97–99.

*The Encyclopedia of Chemical Technology,* Kirtk-Othmer, Third Edition, John Wiley & Sons, New York, 1981, vol. 16, pp. 415–417.

*The Encyclopedia of Chemical Technology,* Kirk-Othmer, Third Edition, John Wiley & Sons New York, 1981, vol. 18, pp. 191–192.

*Journal of Polymer Science, Poly. Phys. Ed.,* "Determination of Branching Distributions in Polyethylene and Ethylene Copolymers", vol. 20, pp. 441–455 (1982) Wild et al.

*Journal of Rhelogy,* "Wall Slip in Viscous Fluids and Influence of Materials of Construction", 30(2), pp. 337–257 (1986), by Ramamurthy.

*Proceedings of the 1991 IEEE Power Engineering Society,* pp. 184–190, Sep. 22–27, 1991, "New Speciality Linear Polymers (SLP) for Power Cables", by Hendewerk et al.

*1992 Polymers, Laminations & Coatings Conference,* pp. 103–111, "A New Family of Linear Ethylene Polymers with Enhanced Sealing Performance designed for Multilayer Barrier Food Packaging Films" by D. Van der Sanden and R. W. Halle.

*1991 Polymers, Laminations & Coatings Conference,* pp. 289–296, "A New Family of Linear Ethylene Polymers Provides Enhanced Sealing Performance" by Van der Sanden et al.

*Feb. 1992 Tappai Journal,* pp. 99–103, "A New Family of Linear Ethylene Polymers Provides Enhanced Sealing Performance" by Van der Sanden et al.

HIGH DRAWDOWN EXTRUSION PROCESS WITH GREATER RESISTANCE TO DRAW RESONANCE

CROSS-REFERENCE TO RELATED APPLICATIONS

This application is a continuation-in-part of pending application Ser. No. 07/776,130, filed Oct. 15, 1991, U.S. Pat. No. 5,272,236, in the names of Shih-Yaw Lai, George W. Knight, John R. Wilson, James C. Stevens and Pak-Wing S. Chum, a continuation-in-part of pending application Ser. No. 07/939,281, filed Sep. 2, 1992, U.S. Pat. No. 5,278,272, in the names of Shih-Yaw Lai, George W. Knight, John R. Wilson and James C. Stevens, a continuation-in-part of pending application Ser. No. 08/055,063, filed Apr. 28, 1993, in the names of Kim L. Walton, Rajen M. Patel, Pak-Wing S. Chum and Todd J. Obijeski and is related to pending application Ser. No. 07/961,269, filed Oct. 14, 1992, in the names of Kim Walton and Rajen Patel, the disclosures of all of which are incorporated herein by reference.

BACKGROUND OF THE INVENTION

1. Field of the Invention

This invention pertains to an improved olefin extrusion composition, a process for extrusion coating a substrate or article, and a process for making an extrusion cast film. More particularly, this invention pertains to extrusion coating and extrusion cast film compositions with higher drawdown rates, lower neck-in and higher resistance to draw resonance. The extrusion compositions contain at least one substantially linear ethylene polymer as the thermoplastic component and may beneficially include at least one high-pressure ethylene polymer and/or at least one linear ethylene polymer.

2. Technical Background

It is known that low density polyethylene (LDPE) made by high-pressure polymerization of ethylene with free-radical initiators as well as heterogeneous linear low density polyethylene (LLDPE) and ultra low density polyethylene (ULDPE) made by the copolymerization of ethylene and α-olefins with Ziegler coordination (transition metal) catalysts at low to medium pressures can be used to extrusion coat substrates such as paper board as well as used to prepare extrusion cast film for applications such as disposable diapers and food packaging. However, although LDPE generally exhibits excellent extrusion processability and high extrusion drawdown rates, LDPE extrusion coatings and cast films lack sufficient abuse resistance and toughness for many applications. Conversely, while LLDPE and ULDPE extrusion coatings and cast films offer improved abuse resistance and toughness properties, these ethylene α-olefin polymers can not be extruded or drawn at high take-off rates and they are known to exhibit relatively poor extrusion processability.

The ultimate extrusion drawdown rate of known linear ethylene polymers is limited (at otherwise practicable extrusion line speeds) by the onset of a melt flow instability phenomena known as draw resonance rather than being limited by melt tension breaks due to "strain hardening" which occurs at higher line speeds and is typical for LDPE and other highly branched high pressure ethylene polymers such as, for example, ethyleneacrylic acid (EAA) copolymers and ethylene vinyl acetate (EVA) copolymers.

"Draw resonance" or "melt surging" occurs in LLDPE, ULDPE and other linear polymers such as high density polyethylene (HDPE), polypropylene and polyester during processing that involves rapid drawing or pulling of the melt such as extrusion coating, extrusion cast film fabrication, profile extrusion and fine denier fiber spinning. Also, the onset or occurrence of draw resonance is unmistakable.

The patent teachings of Kurtz et al. in U.S. Pat. No. 4,339,507 and Lucchesi et al. in U.S. Pat. No. 4,486,377 (the disclosures of both of which are incorporated herein by reference) describe draw resonance as a sustained random and/or periodic oscillation, variation or pulsation of the polymer melt with respect to the velocity and cross-sectional area of a melt drawing process that occurs between the die and the take-off position when the boundary conditions are a fixed velocity at the die and a fixed velocity at the take-off position. Draw resonance occurs when the draw ratio (i.e., the melt velocity at take-off divided by the melt velocity instantaneous at the die exit often approximated by dividing the reciprocal of the final polymer thickness by the reciprocal of the thickness of the melt instantaneous at the die exit) exceeds a polymer specific critical value. Draw resonance is a melt flow instability that is manifested as irregularities in the final coating, film or fiber dimensions and often produce widely variable thicknesses and widths. When line speeds significantly exceed the speed of onset, draw resonance can cause web or filament breaks and thereby shut down the entire drawing or converting process.

Given the various differences and intricacies that can exist between different extrusion equipment, relative resistance to draw resonance is often expressed in terms of critical draw ratio, and for conventional linear ethylene polymers, maximum stable draw ratios have been found to be less than 10:1, although draw ratios greater than 20:1 are needed for most commercial drawing operations.

"Drawdown" is defined herein to mean stretching or elongating a molten polymer extrudate (web or filament) in the machine direction and occasionally (simultaneously to a lesser degree) also in the transverse direction.

"Melt tension" which is also referred to in the relevant art as "melt strength" is defined and quantified herein to mean the stress or force (as applied by a wind-up drum equipped with a strain cell) required to draw a molten extrudate at some specified rate above its melting point as it passes through the die of a standard plastometer such as the one described in ASTM D1238-E. Melt tension values, which are reported herein in grams, are determined at 190 C. using a 2.16 kg weight and a 30 rpm wind-up rate. In general, for conventional linear and high pressure ethylene polymers, melt tension tends to increase with increased molecular weight, or with broadening of the molecular weight distribution and/or with increased melt flow ratios.

"Neck-in" which is influenced by extrudate swelling and, to lesser degree, by surface tension effects is defined herein as the difference between the die width and the web width at the taken-off position. Measured neck-in values (at constant output) will remain constant or decrease as the drawdown rate increases, and, in general, it is well known that for conventional ethylene polymers neck-in values increase as molecular weight decreases and/or as the molecular weight distribution narrows.

"Take-off position" is defined herein to mean the contact point (either the top or bottom) of a roller device that draws or pulls the molten extrudate down from its initial thickness instantaneous at the die exit to its final thickness. The roller device can be a nip roll, rubber roll, a chill roll, combinations thereof, or the like constructed from, for example, metal or rubber with various surfaces such as polished, matte or embossed finishes; all of which can to varying degrees affect the onset of draw resonance.

A variety of potential solutions have been disclosed to address the neck-in and/or draw resonance tendencies of linear polymers. Many of these solutions are equipment related and others primarily relate to modification of the properties of the linear polymers by forming polymer blends with highly branched high pressure ethylene polymers such as, for example, low density polyethylene. Thompson in U.S. Pat. No. 4,348,346 (which is incorporated herein by reference) is an example of equipment related attempts to address neck-in and draw resonance. Thompson describes a secondary injection of polymer melt streams into the primary die at the edges of the primary web stream is described to reduce neck-in and provide improved edge bead control.

An equipment modification solution specific to retarding the onset of draw resonance is provided by Cancio et al. in U.S. Pat. No. 4,668,463 and U.S. Pat. No. 4,626,574 (the disclosures of both of which are incorporated herein by reference) where locating a draw roller not more than 6 inches (15.2 cm) from the die provides a short air/draw gap and reduced draw resonance. Luchessi et al. in U.S. Pat. No. 4,486,377, teaches the use of a fluid medium, e.g., nitrogen, carbon monoxide or air, directed against the molten web prior to the take-off position as a viable method of retarding draw resonance. Similarly, Kurtz et al. in U.S. Pat. No. 4,608,221 (the disclosure of which is incorporated herein by reference) discloses that draw resonance can be mitigated by the utilization of a tensioning device with a friction free surface in a "rapid cooling zone" between the die and the take-off position.

Conversely, as another equipment modification example for alleviating or reducing draw resonance, Chaing in U.S. Pat. No. 4,859,379 (the disclosure of which is incorporated herein by reference) discloses radiant heating of the molten web prior to a chill roll take-off position.

Examples of modified linear polymer compositions exhibiting reduced draw resonance include U.S. Pat. No. 4,378,451 (Edwards), the disclosure of which is incorporated herein by reference, which discloses high flow rate compositions based on degraded propylene polymers blended with low density polyethylene. A similar example is provided by Werkman et al. in U.S. Pat. No. 3,247,290 (the disclosure of which is incorporated herein by reference) wherein thermally degraded (visbroken) high density polyethylene is blended with low density polyethylene to prepare high drawdown extrusion coating compositions. Another linear polymer blend example involving low density polyethylene is disclosed by Kurtz et al. in U.S. Pat. No. 4,339,507 where high pressure LDPE at 20 to 98 weight percent in combination with heterogeneous conventional LLDPE is taught to provide extrusion coating compositions with improved running rates.

An example of compositions that reduce draw resonance without the inclusion of a polymer degradation step and/or blending with a branched high pressure ethylene polymer is taught by Dohrer et al. in U.S. Pat. No. 4,780,264 where LLDPE with melt flow ratios less than 8.3 (i.e., utilizing molecular weight distributions even more narrow than typically employed) were found to allow surprisingly fast line speeds in extrusion coating and extrusion casting. However, predictably, these materials also exhibit higher neck-in and/or poor extrusion processability (e.g., higher extruder amperage).

In spite of the various advances, there is still a need for avoiding draw resonance and high neck-in problems when extruding known linear olefin polymer compositions at high extrusion line speeds. More particularly, there is also a need for extrusion coating and extrusion-casting materials that allow even higher line speeds and better extrusion processability than the lower melt flow ratio linear olefin polymers taught by Dohrer et al. in U.S. Pat. No. 4,780,264 and the polymer blends described by Kurtz et al. in U.S. Pat. No. 4,339,507. It is also desirable to avoid mechanical or equipment modifications that are designed to alter the drawing process itself as a means of attaining greater resistance draw resonance and lower neck-in. Additionally, to a lesser extent, there is also a desire to avoid the extra detail involved in providing appropriately degraded polymers as separately described by Werkman et al. and Edwards. As described hereinafter, the present invention substantially fills such desires and needs by providing compositions comprising at least one substantially linear ethylene polymer. However, if cast film or extrusion coating equipment modifications are already installed, and/or if blending with thermally degraded polymers is desired, or if the use of linear olefin polymers with lower melt flow ratios is desired, the present invention can still be employed to good advantage and the combined or synergistic benefits of the present invention and known solutions can also be realized.

SUMMARY OF THE INVENTION

In accordance with the present invention, we have discovered a new and improved:

Process for extrusion coating a substrate or for making a cast film with a thermoplastic composition, comprising the steps of:
  (i) feeding a thermoplastic composition into at least one extruder,
  (ii) melting and mixing the thermoplastic composition to form at least one uniform molten polymer stream,
  (iii) extruding the molten polymer stream through a die to form a primary web,
the improvement comprising:
  (i) operating said extruder at line speeds greater than 152 meters/minute, and either
    (a) drawing down said web onto said substrate to thereby coat said substrate with at least one layer of said thermoplastic composition, or
    (b) cooling and drawing down said web onto a take-off device to make said film with at least one layer of said thermoplastic composition,
  (ii) conveying or collecting said coated substrate or said film for subsequent use, and
  (iii) using as said thermoplastic composition:
    (I) from about 10 to 100 percent by weight of at least one substantially linear ethylene polymer characterized as having:
      (a) a melt flow ratio, $I_{10}/I_2, \geq 5.63$, (b) a molecular weight distribution, $M_w/M_n$, defined by the equation: $M_w/M_n \leq (I_{10}/I_2) - 4.63$, (c) a critical shear rate at the onset of surface melt fracture of at least 50 percent greater than the critical shear rate at the onset of surface melt fracture of a linear olefin polymer having about the same $I_2$ and $M_w/M_n$, and (d) a single melting peak as determined using differential scanning calorimetry; and (II) from 0 to about 90 percent by weight of at least one polymer selected from the group consisting of a heterogeneous linear ethylene polymer and high pressure ethylene polymer.

With the present invention, one obtains reduced neck-in, higher drawdown rates, and greater resistance to draw resonance than obtainable with heterogeneous linear ethylene polymers.

DESCRIPTION OF THE PREFERRED EMBODIMENTS

Substantially Linear Ethylene Polymers

Figure 1:
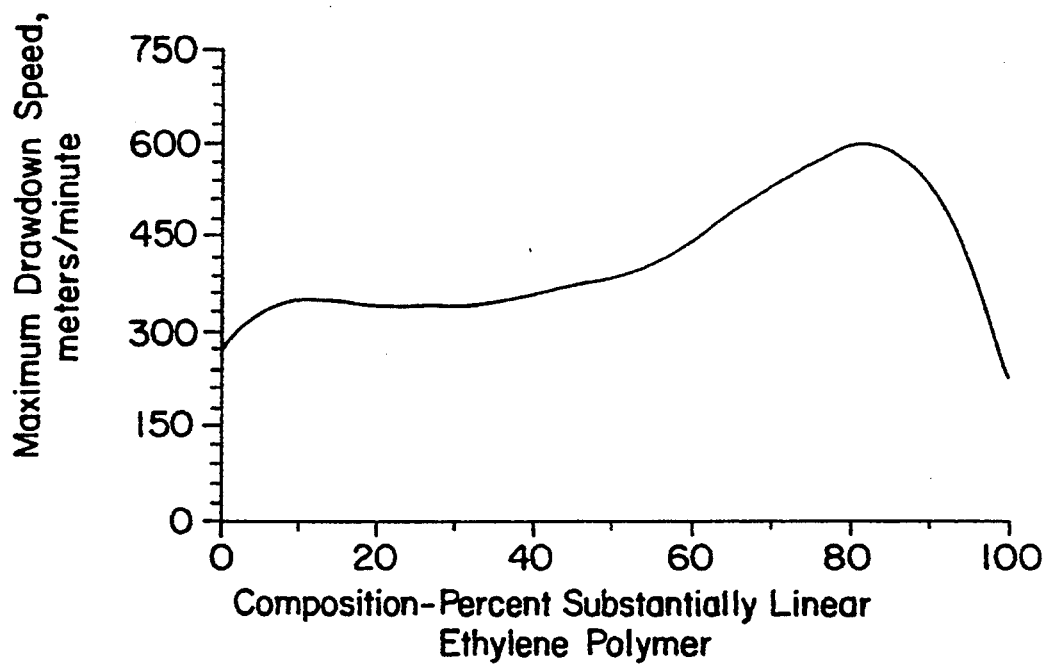
FIG. 1 is a plot showing the maximum drawdown rate as a function of weight percent of a 6.7 Melt Index substantially linear ethylene polymer blended with a 8 Melt Index high pressure low density polyethylene.

The substantially linear ethylene polymers (either homopolymers or interpolymers) used in the present invention are a unique class of compounds that are further defined in copending application Ser. No. 07/776,130 filed Oct. 15, 1991 and in copending application Ser. No. 07/939,281 filed Sep. 2, 1992, each of which is incorporated herein by reference.

Substantially linear ethylene homopolymers and interpolymers are a truly unique class of ethylene polymers. They differ substantially from the class of conventional homogeneously branched linear ethylene/α-olefin copolymers described by Elston in U.S. Pat. No. 3,645,992, and moreover, they are not in the same class as conventional heterogeneous Ziegler polymerized linear ethylene polymers (e.g., ultra low density polyethylene, linear low density polyethylene or high density polyethylene made, for example, using the technique disclosed by Anderson et al. in U.S. Pat. No. 4,076,698, incorporated herein by reference, and utilized by Dohrer et al. as described in U.S. Pat. No. 4,780,264), nor are they in the same class as free-radical initiated highly branched high pressure low density ethylene homopolymer and ethylene interpolymers such as, for example, ethylene-acrylic acid (EAA) copolymers and ethylene-vinyl acetate (EVA) copolymers.

The substantially linear ethylene homopolymers and interpolymers useful in this invention have excellent processability, even though they have relatively narrow molecular weight distributions and exhibit improved resistance to draw resonance such that cast films and extrusion coatings with uniform dimensions can be prepared at higher extrusion line speeds. Surprisingly, in light of disclosures by Dohrer and Niemann (U.S. Pat. No. 4,780,264 and ANTEC Proceedings 1989, "Resistance to Draw Resonance of Linear Low Density Polyethylene Through Improved Resin Design", page 28–30), the melt flow ratio ($I_{10}/I_2$) of the substantially linear ethylene homopolymers or interpolymers can be varied widely and essentially independently of the polydispersity index (i.e., the molecular weight distribution, $M_w/M_n$). More particularly, this behavior is also a contradistinction to the linear ethylene/α-olefin copolymers described by Elston in U.S. Pat. No. 3,645,992 and to the heterogeneous conventional Ziegler polymerized linear polyethylene copolymers having rheological properties such that as the polydispersity index increases, the $I_{10}/I_2$ value also increases.

The term "homogeneously branched" when applied to ethylene/α-olefin copolymers is defined herein to mean that (1) the α-olefin comonomer is randomly distributed within a given molecule, and (2) substantially all of the copolymer molecules have the same ethylene-to-comonomer ratio. When the term "homogeneously branched" is applied to both ethylene homopolymers and copolymers, it is defined herein to mean that (1) the polymer is characterized by a narrow short chain branching distribution where the short chain branching index (defined herein below) is greater than 30 percent, more preferably greater than 50 percent, and (2) the polymer essentially lacks a measurable high density (crystalline) polymer fraction as measured by known fractionation techniques such as, for example, a method that involves polymer fractional elutions as a function of temperature.

The term "high pressure" or "highly branched" is defined herein to mean that the polymer is partly or entirely homopolymerized or interpolymerized in autoclave or tubular reactors at pressures above 14,500 psi (100 MPa) with the use of free-radical initiators.

The term "interpolymer" is used herein to indicate a copolymer, or a terpolymer, or the like, where, at least one other comonomer is polymerized with ethylene to make the interpolymer.

The term "polymer" is used herein to indicate homopolymer and/or interpolymer, where ethylene is polymerized alone or with at least one other comonomer.

The term "thermoplastic" is used herein to indicate polymers or polymer compositions that are substantially thermally extrudable or deformable albeit relatively aggressive conditions may be required.

The term "substantially linear" means that the polymer backbone is substituted with about 0.01 long chain branch/1000 carbons to about 3 long chain branches/1000 carbons, more preferably from about 0.01 long chain branches/1000 carbons to about 1 long chain branch/1000 carbons, and especially from about 0.05 long chain branch/1000 carbons to about 1 long chain branch/1000 carbons.

The term "long chain branching" is defined herein as a chain length of at least about 6 carbons, above which the length cannot be distinguished using $^{13}C$ nuclear magnetic resonance spectroscopy, yet the long chain branch can be about the same length as the length of the polymer back-bone.

Long chain branching is determined by using $^{13}C$ nuclear magnetic resonance (NMR) spectroscopy and is quantified using the method described by Randall (*Rev.*

*Macromol. Chem. Phys.*, C29, V. 2&3, p. 285–297), the disclosure of which is incorporated herein by reference.

The substantially linear homopolymers for use in the extrusion compositions, films, coatings and processes of the present invention are polymers of ethylene involving no additional monomer or comonomer although at least one chain transfer agent may be employed to affect specific polymer molecular characteristics. The substantially linear ethylene interpolymers for use in the present invention have a single melting peak, as opposed to conventional heterogeneous Ziegler polymerized polymers which have two or melting points as determined using differential scanning calorimetry (DSC). Also, the substantially linear ethylene polymers of the present invention are interpolymers of ethylene with at least one $C_3$-$C_{20}$ α-olefin and/or $C_4$-$C_{18}$ diolefin. Copolymers of ethylene and an α-olefin of $C_3$-$C_{20}$ carbon atoms are especially preferred.

Suitable unsaturated comonomers useful for polymerizing with ethylene include, for example, ethylenically unsaturated monomers, conjugated or non-conjugated dienes, polyenes, etc. Examples of such comonomers include $C_3$-$C_{20}$ α-olefins as propylene, isobutylene, 1-butene, 1-hexene, 4-methyl-1-pentene, 1-heptene, 1-octene, 1-nonene, 1-decene, and the like. Preferred comonomers include propylene, 1-butene, 1-hexene, 4-methyl-1-pentene and 1-octene, and 1-octene is especially preferred. Other suitable monomers include styrene, halo- or alkyl-substituted styrenes, tetrafluoroethylene, vinylbenzocyclobutane, 1,4-hexadiene, 1,7-octadiene, and cycloalkenes, e.g., cyclopentene, cyclohexene and cyclooctene.

The density of the substantially linear ethylene interpolymers or homopolymers (as measured in accordance with ASTM D-792) for use in the present invention is generally greater than about 0.85 grams/cubic centimeter (g/cm$^3$), especially from about 0.86 g/cm$^3$ to about 0.96 g/cm$^3$, more preferably, from about 0.87 g/cm$^3$ to about 0.955 g/cm$^3$, and most preferably, from about 0.88 to about 0.95 g/cm$^3$.

The molecular weight of the substantially linear ethylene interpolymers or homopolymers is conveniently indicated using a melt index measurement according to ASTM D-1238, Condition 190 C./2.16 kilogram (kg), formerly known as "Condition E" and also known as $I_2$. Melt index is inversely proportional to the molecular weight of the polymer. Thus, the higher the molecular weight, the lower the melt index, although the relationship is not linear. The melt index for the substantially linear ethylene interpolymers and homopolymers useful herein is generally from about 0.01 gram/10 minutes (g/10 min.) to about 40 g/10 min., preferably from about 0.1 g/10 min. to about 35 g/10 min., and especially from about 1 g/10 min. to about 20 g/10 min.

Other measurements useful in characterizing the molecular weight of substantially linear ethylene interpolymers and homopolymers involve melt index determinations with higher weights, such as, for common example, ASTM D-1238, Condition 190 C/10 kg (formerly known as "Condition N" and also known as $I_{10}$). "Melt flow ratio" is defined herein as the ratio of a higher weight melt index determination to a lower weight determination, and for measured $I_{10}$ and the $I_2$ melt index values, the melt flow ratio is conveniently designated as $I_{10}/I_2$.

Unlike heterogeneous conventional linear polymers which possess no substantial long chain branching, for the substantially linear ethylene interpolymers and homopolymers used to prepare the extrusion compositions, cast films and extrusion coatings of the present invention, the melt flow ratio actually indicates the degree of long chain branching, i.e., the higher the $I_{10}/I_2$ melt flow ratio, the more long chain branching in the polymer. The $I_{10}/I_2$ ratio of the substantially linear ethylene interpolymers and homopolymers is preferably at least about 5.63, and especially from about 5.63 to about 18, and most especially from about 6 to about 15.

The "rheological processing index" (PI) which is defined herein as the apparent viscosity in kpoise of a polymer measured by a gas extrusion rheometer (GER), can also be used to distinguish the substantially linear ethylene polymers of this invention. The gas extrusion rheometer is described by M. Shida, R. N. Shroff and L. V. Cancio in *Polymer Engineering Science*, Vol. 17, No. 11, p. 770 (1977), and in "Rheometers for Molten Plastics" by John Dealy, published by Van Nostrand Reinhold Co. (1982) on pp. 97–99, both publications of which are incorporated by reference herein in their entirety. GER experiments are performed at a temperature of 190° C., at nitrogen pressures between 250 to 5500 psig (17–379 bars) using about a 7.54 cm diameter, 20:1 L/D die with an entrance angle of 180°. For the substantially linear ethylene polymers described herein, the PI is the apparent viscosity (in kpoise) of a material measured by GER at an apparent shear stress of $2.15 \times 10^6$ dyne/cm$^2$. The unique substantially linear ethylene interpolymers and homopolymers described herein preferably have a PI in the range of about 0.01 kpoise to about 50 kpoise, preferably about 15 kpoise or less. The unique substantially linear ethylene interpolymers and homopolymers described herein have a PI less than or equal to about 70% of the PI of a comparative linear ethylene polymer (either a Ziegler polymerized polymer or a linear uniformly branched polymer as described by Elston in U.S. Pat. No. 3,645,992) at about the same $I_2$ and $M_w/M_n$.

To more fully characterize the rheological behavior of the unique substantially linear ethylene polymers, S. Lai and G. W. Knight recently introduced (*ANTEC '93 Proceedings*, INSITE ™ Technology Polyolefins (ITP-)—New Rules in the Structure/Rheology Relationship of Ethylene α-Olefin Copolymers, New Orleans, La., May 1993) another rheological measurement, the Dow Rheology Index (DRI), which expresses a polymer's "normalized relaxation time as the result of long chain branching." DRI ranges from 0 for polymers which do not have any measurable long chain branching (e.g., Tafmer ™ and Exact ™ products) to about 15 and is independent of melt index. In general, for low to medium pressure ethylene polymers (particularly at lower densities) DRI provides improved correlations to melt elasticity and high shear flowability relative to correlations of the same attempted with melt flow ratios, and for the substantially linear ethylene polymers of this invention, DRI is preferably at least about 0.1, and especially at least about 0.5, and most especially at least 0.8. DRI can be calculated from the equation:

$$DRI = (3652879 * \tau_o^{1.00649}/\eta_o - 1)/10$$

where $\tau_o$ is the characteristic relaxation time of the material and $\eta_o$ is the zero shear viscosity of the material. Both $\tau_o$ and $\eta_o$ are the "best fit" values to the Cross equation, i.e.

$$\eta/\eta_o = 1/(1+(\gamma^* \tau_o)^{1-n})$$

where n is the power law index of the material, and $\eta$ and $\gamma$ are the measured viscosity and shear rate, respectively. Baseline determination of viscosity and shear rate data are obtained using a Rheometric Mechanical Spectrometer (RMS-800) under dynamic sweep mode from 0.1 to 100 radians/second at 160 C. and a Gas Extrusion Rheometer (GER) at extrusion pressures from 1,000 psi to 5,000 psi (corresponding shear stress from 0.086 to 0.43 MPa) using a 7.54 centimeter diameter, 20:1 L/D die at 190 C. Specific material determinations can be performed from 140 to 190 C. as required to accommodate melt index variations.

For the substantially linear ethylene polymers of this invention, DRI relates linearly to draw ratio in accordance with the equation:

$$\text{Critical Draw Ratio} = 9.0641 + 29.264 * \text{DRI}.$$

For the substantially linear ethylene polymers of the present invention, the molecular interrelationship between melt index, melt tension and maximum draw ratio before the onset of draw resonance is expressed by the following equation:

$$\text{Critical Draw Ratio} = a * \text{MT} - b * \text{MI} - c * \text{MT}^2 + d * \text{MI}^2 + e * \text{MT} * \text{MI}$$

where,
- a is a coefficient from about 39 to about 60, and especially from about 45 to about 53;
- b is a coefficient from about 7 to about 11, and especially from about 8 to about 10.5;
- c is a coefficient from about 33 to about 46, and especially from about 36 to about 43;
- d is a coefficient from about 0.5 to about 0.9, and especially from about 0.55 to about 0.85;
- e is a coefficient from about 13 to about 24, and especially from about 16 to about 21;
- MT is Melt Tension determined at 190 C. as described above; and
- MI is Melt Index determined in accordance with ASTM D1238 Condition 190 C./2.16 kg.

In addition to the onset of draw resonance and various rheological characterizations, ethylene polymers can also be distinguished by melt flow consequences that are manifested as solid state surface defects. Unlike draw resonance which is observed during drawing and pertains to irregularities in the extrudate dimension, an apparent shear stress versus apparent shear rate plot is used to identify the "melt fracture" phenomena which pertains to surface irregularities. According to Ramamurthy in the *Journal of Rheology*, 30(2), 337–357, 1986, above a certain critical shear rate (in contrast to a critical draw rate for the draw resonance phenomena), the observed extrudate irregularities may be broadly classified into two main types: surface melt fracture and gross melt fracture.

Surface melt fracture occurs under apparently steady flow conditions and ranges in detail from loss of specular film gloss to the more severe form of "sharkskin." In this disclosure, the onset of surface melt fracture (OSMF) is characterized at the beginning of losing extrudate gloss at which the surface roughness of the extrudate can only be detected by 40× magnification. The critical shear rate at the onset of surface melt fracture for the substantially linear ethylene interpolymers and homopolymers is at least 50 percent greater than the critical shear rate at the onset of surface melt fracture of a comparative linear ethylene polymer (either a Ziegler polymerized polymer or a linear homogeneously branched polymer as described by Elston in U.S. Pat. No. 3,645,992) having about the same $I_2$ and $M_w/M_n$.

Gross melt fracture occurs at unsteady extrusion flow conditions, and ranges in detail from regular (alternating rough and smooth, helical, etc.) to random distortions. For commercial acceptability, (e.g., in cast films and bags therefrom), surface defects should be minimal, if not absent, for good film/coating quality and properties. The critical shear stress at the onset of gross melt fracture for the substantially linear ethylene interpolymers and homopolymers used in the present invention is greater than about $4 \times 10^6$ dynes/cm$^2$. The critical shear rate at the onset of surface melt fracture (OSMF) and the onset of gross melt fracture (OGMF) will be used herein based on the changes of surface roughness and configurations of the extrudates extruded by a GER.

The distribution of comonomer branches for the substantially linear ethylene interpolymers and homopolymers is characterized by its SCBDI (Short Chain Branch Distribution Index) or CDBI (Composition Distribution Branch Index) and is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, by Wild et al., *Journal of Polymer Science, Poly. Phys. Ed.*, Vol. 20, p. 441 (1982), or in U.S. Pat. No. 4,798,081, both disclosures of which are incorporated herein by reference. The SCBDI or CDBI for the substantially linear interpolymers and homopolymers of the present invention is preferably greater than about 30 percent, especially greater than about 50 percent.

The substantially linear ethylene interpolymers and homopolymers used in this invention essentially lack a measurable "high density" fraction as measured by the TREF technique. The substantially linear interpolymers and copolymers do not contain a polymer fraction with a degree of branching less than or equal to 2 methyls/1000 carbons. The "high density polymer fraction" can also be described as a polymer fraction with a degree of branching less than about 2 methyls/1000 carbons. Among other benefits, the lack of high density polymer fraction permits improved coating smoothness, printability, optical properties as well as enhanced film/coating flexibility and elasticity.

Molecular Weight Distribution Determination

The substantially linear ethylene interpolymers and homopolymers are analyzed by gel permeation chromatography (GPC) on a Waters 150 high temperature chromatographic unit equipped with differential refractometer and three columns of mixed porosity. The columns are supplied by Polymer Laboratories and are commonly packed with pore sizes of $10^3$, $10^4$, $10^5$ and $10^6$ Å. The solvent is 1,2,4-trichlorobenzene, from which 0.3 percent by weight solutions of the samples are prepared for injection. The flow rate is 1.0 milliliters/minute and the operating temperature is 140 C. with a 100-microliter injection size.

The molecular weight determination with respect to the polymer backbone is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science*, Polymer Letters, Vol. 6, p. 621, 1968, incorporated herein by reference) to derive the following equation:

$$M_{polyethylene} = a * (M_{polystyrene})^b.$$

In this equation, a = 0.4316 and b = 1.0. Weight average molecular weight, $M_w$, is calculated in the usual manner according to the following formula: $Mw = R\ w_i * M_i$, where $w_i$ and $M_i$ are the weight fraction and molecular weight, respectively, of the $i^{th}$ fraction eluting from the GPC column.

For the substantially linear ethylene interpolymers and homopolymers used in the present invention, the $M_w/M_n$ is preferably from about 1.5 to about 8, and especially from about 1.7 to about 6.5.

Polymerization Catalysts for Substantially Linear Ethylene Polymers

Single site polymerization catalysts, (e.g., the monocyclo-pentadienyl transition metal olefin polymerization catalysts described by Canich in U.S. Pat. No. 5,026,798 or by Canich in U.S. Pat. No. 5,055,438, the disclosures of which are both incorporated herein by reference) or constrained geometry catalysts (e.g., as described by Stevens et al. in U.S. Pat. No. 5,064,802, incorporated herein by reference) can be used to polymerize the substantially linear interpolymers and copolymers, so long as the catalysts are used consistent with the methods described in U.S. Ser. No. 07/776,130 and in U.S. Ser. No. 07/939,281. Such polymerization methods are also described in PCT/U.S. Ser. No. 92/08812 (filed Oct. 15, 1992), the disclosure of which is incorporated herein by reference. However, the substantially linear ethylene interpolymers and homopolymers are preferably made by using suitable constrained geometry catalysts, especially constrained geometry catalysts as disclosed in U.S. application Ser. Nos.: 545,403, filed Jul. 3, 1990; 758,654, filed Sep. 12, 1991; 758,660, filed Sep. 12, 1991; and 720,041, filed Jun. 24, 1991, the teachings of all of which are incorporated herein by reference.

Suitable cocatalysts for use herein include but are not limited to, for example, polymeric or oligomeric aluminoxanes, especially methyl aluminoxane or modified methyl aluminoxane (made, e.g., as described in U.S. Pat. No. 5,041,584, U.S. Pat. No. 4,544,762, U.S. Pat. No. 5,015,749, and/or U.S. Pat. No. 5,041,585, the disclosures of each of which are incorporated herein by reference) as well as inert, compatible, non-coordinating, ion forming compounds. Preferred cocatalysts are inert, non-coordinating, boron compounds.

Preparation of the Substantially Linear Ethylene Polymer

The polymerization conditions for manufacturing the substantially linear ethylene homopolymers and interpolymers of the present invention are preferably those useful in the solution polymerization process, although the application of the present invention is not limited thereto. Slurry and gas phase polymerization processes are also useful, provided the proper catalysts and polymerization conditions are employed. To polymerize the substantially linear interpolymers and copolymers useful in the invention, the single site and constrained geometry catalysts mentioned earlier can be used, but for substantially linear ethylene polymers the polymerization process should be operated such that the substantially linear polymers are formed. That is, not all polymerization conditions inherently make the substantially linear ethylene polymers, even when the same catalysts are used.

For example, in one embodiment of a polymerization process useful in making the novel substantially linear ethylene polymers, a continuous process is used, as opposed to a batch process.

Preferably, for substantially linear ethylene polymers, the polymerization is performed in a continuous solution polymerization process. Generally, manipulation of $I_{10}/I_2$ while holding $M_w/M_n$ relatively low for producing the substantially linear ethylene polymers using constrained geometry catalyst technology described herein is a function of reactor temperature and/or ethylene concentration. Reduced ethylene concentration and higher temperature generally produces higher $I_{10}/I_2$. Generally, as the ethylene concentration of the reactor decreases, the polymer concentration increases. For the novel substantially linear ethylene interpolymers and homopolymers, the polymer concentration for a continuous solution polymerization process is preferably above about 5 weight percent of the reactor contents, especially above about 6 weight percent of the reactor contents. Generally, the polymerization temperature of the continuous process, using constrained geometry catalyst technology, is from about 20 C. to about 250 C. If a narrow molecular weight distribution polymer ($M_w/M_n$ of from about 1.5 to about 2.5) having a higher $I_{10}/I_2$ ratio (e.g. $I_{10}/I_2$ of about 7 or more, preferably at least about 8, especially at least about 9) is desired, the ethylene concentration in the reactor is preferably not more than about 8 percent by weight of the reactor contents, especially not more than about 6 percent by weight of the reactor contents, and most especially not more than about 4 percent by weight of the reactor contents.

Multiple reactor polymerization processes can also be used in making the substantially linear olefin interpolymers and homopolymers of the present invention, such as those processes disclosed in copending applications Ser. No. 07/815,716 filed Dec. 30, 1991 and Ser. No. 08/010,958 filed Jan. 29, 1993, and in U.S. Pat. No. 3,914,342, the disclosures of all of which are incorporated herein by reference. The multiple reactors can be operated in series or in parallel or a combination thereof, with at least one constrained geometry catalyst employed in at least one of the reactors.

Additional Embodiments

Additives such as antioxidants (e.g., hindered phenolics such as Irganox ®1010 or Irganox ®1076 supplied by Ciba Geigy), phosphites (e.g., Irgafos ®168 also supplied by Ciba Geigy), cling additives (e.g., PIB), Standostab PEPQ TM (supplied by Sandoz), pigments, colorants, fillers, and the like can also be included in the interpolymers and copolymers of the present invention, to the extent that they do not interfere with the improved draw resonance resistance discovered by Applicants. The extrusion coatings and films may also contain additives to enhance antiblocking and coefficient of friction characteristics including, but not limited to, untreated and treated silicon dioxide, talc, calcium carbonate, and clay, as well as primary, secondary and substituted fatty acid amides, chill roll release agents, silicone coatings, etc. Other additives may also be added to enhance the anti-fogging characteristics of, for example, transparent cast films, as described, for example, by Niemann in U.S. Pat. No. 4,486,552, the disclosure of which is incorporated herein by reference. Still other additives, such as quaternary ammonium compounds alone or in combination with ethylene-acrylic acid (EAA) copolymers or other functional polymers, may also be added to enhance the antistatic characteristics of coatings and films of this invention and allow, for example, the packaging of electronically sensitive goods.

The substantially linear ethylene polymers used to prepare the compositions and products of the present invention can be blended with linear ethylene polymers and/or high pressure ethylene polymers, or used as the only resinous polymer component whether the resultant film or coating to be used is a monolayer or multilayer construction. Still other polymers can also be blended with the substantially linear ethylene interpolymers or homopolymers to modify processing, film strength, heat seal, or adhesion characteristics.

Some useful materials for blending with substantially linear ethylene interpolymers and homopolymers include, for example, but are not limited to, low density ethylene polymer such as high pressure low density ethylene homopolymer (LDPE), ethylene-vinyl acetate copolymer (EVA), ethylene-carboxylic acid copolymers and ethylene acrylate copolymers as well as olefin polymers produced at low to medium pressures such as polybutylene (PB) and ethylene/α-olefin polymers which includes high density polyethylene, medium density polyethylene, polypropylene, ethylene-propylene interpolymers, linear low density polyethylene (LLDPE) and ultra low density polyethylene, as well as graft-modified polymers, and combinations thereof including $I_{10}/I_2$, MWD, and/or comonomer combinations.

Suitable high pressure ethylene interpolymers include ethylene interpolymerized with at least one α,β-ethylenically unsaturated comonomers (e.g., acrylic acid, methacrylic acid and vinyl acetate) as described by McKinney et al. in U.S. Pat. No. 4,599,392, the disclosure of which is incorporated herein by reference. Preferred high pressure ethylene interpolymers comprise from about 0.1 to about 55 total weight percent comonomer, and more preferably from about 1 to about 35 total weight percent comonomer, and most preferably from about 2 to about 28 total weight percent comonomer, and can be chemically and/or physically modified by any known technique such as, for example, by ionomerization and extrusion grafting.

However, preferred polymer blends comprise at least one substantially linear ethylene polymer, and preferably the substantially linear ethylene interpolymer or homopolymer comprises at least about 5 percent of the blend composition, more preferably at least about 10 percent of the blend composition.

For the multilayer coatings and films of the present invention, any layer and any number of layers can comprise at least one substantially linear ethylene polymer. However, highly preferably, though, for multilayer film and coating constructions, outer layers (alternatively referred to in the art as "skin layers" or "surface layers") and sealant layers would comprise at least one substantially linear ethylene interpolymer and/or homopolymer.

The blend compositions of this invention can be prepared by any suitable means known in the art including tumble dry-blending, melt blending via compound or side-arm extrusion, or the like as well as combinations thereof. Also, the multilayer constructions of this invention can be prepared by any means known including coextrusion, laminations and the like and combinations thereof. Moreover, compositions of this invention can be employed in coextrusion operations where a higher drawdown material is used to essentially "carry" one or more lower drawdown materials. The blended and non-blended compositions of this invention, whether of monolayer or multilayer construction, can be used to coat various polar and nonpolar substrates including for example, but not limited to, paper products, metals, ceramics, glass and various polymers, particularly other polyolefins, and combinations thereof.

EXAMPLES

The following examples illustrate some of the particular embodiments of the present invention, but the following should not be construed to mean the invention is limited to the particular embodiments shown. Also, practitioners of these arts will appreciate that the maximum line speeds attainable with one type of extruder or coater will not necessarily be the same as the speeds attainable with another and the same equipment arrangement should be used for meaningful comparisons.

Examples 1-6

In the following Examples 1-6, Table 1 summarizes the polymers used in an extrusion coating evaluation. The coating equipment consists of a two-extruder Black Clawson coextrusion coating line with a 3½ inch (8.9 cm) diameter primary extruder with a 30:1 L/D and a 2½ inch (6.4 cm) diameter secondary extruder with a 24:1 L/D. A 76 cm slot die is attached and deckled to 69 cm with a 20 mil die gap and a 6 inch (15.2 cm) air/draw gap. The targeted extrusion temperature and screw speed for all extrusion coating examples is 610 F. (316 C.) and 90 rpm, respectively, unless otherwise noted. Molten webs are drawn down to continuous 50 lb. Kraft paper as well as to slip-sheets of aluminum and oriented polypropylene.

TABLE 1

| Sample | Polymer Type | Melt Index (g/10 min.) | Density (g/cc) | Melt Flow Ratio ($I_{10}/I_2$) | $M_w/M_n$ |
|---|---|---|---|---|---|
| A | SLEP | 4.5 | 0.902 | 7.4 | 2.15 |
| B | SLEP | 4.7 | 0.910 | 8.0 | 2.28 |
| C | SLEP | 9.4 | 0.910 | 7.5 | 2.28 |
| D | SLEP | 8.1 | 0.913 | 6.7 | ND |
| E* | LINEAR | 4.0 | 0.904 | 7.9 | ND |
| F* | LINEAR | 5.4 | 0.911 | 7.6 | 3.4 |

*Not an example of the present invention; provided for comparative purposes only.
SLEP = substantially linear ethylene polymer prepared by the interpolymerization of ethylene and 1-octene.
LINEAR = heterogeneous conventional ultra low density polyethylene prepared by the interpolymerization of ethylene and 1-octene as described in U.S. Pat. No. 4,076,698 and 4,780,264.
ND = not determined.

Samples A-F are evaluated on the above described Black Clawson coextrusion line. The evaluation involved systematically increasing the take-off speed while maintaining a constant screw speed (90 rpm). The line speed where the onset of draw resonance (i.e., web began to oscillate) is initially observed, is taken as the ultimate or maximum drawdown rate. The drawdown rate, neck-in measured at a 440 fpm (134 mpm) line speed for a 1 mil coating thickness and the output rate at ultimate drawdown are summarized in Table 2 for these samples.

TABLE 2

Extrusion Coating Results on Draw Resonance and Neck-In

| Example | Sample | Drawdown † Rate ft/min. (mpm) | Neck-In at 134 mpm/1 Mil (cm) | Output (kg/hr/hp) |
|---|---|---|---|---|
| 1 | A | 600 (183) | 21 | 3.2 |
| 2 | B | 650 (198) | 21 | 3.4 |
| 3 | C | 780 (238) | 21 | 3.9 |
| 4 | D | 570 (174) | 24 | 3.2 |
| 5* | E | 350 (107) | ** | 2.9 |
| 6* | F | 440 (134) | 23 | ND |

Drawdown rate = take-off speed at which dimensional irregularities are observed to initially occur.
*Not an example of the present invention; provided for comparative purposes.
**Draw resonance onset at 107 mpm, could not achieve 134 mpm to produce a uniform 1 mil coating and obtain comparative neck-in measurements.
ND = not determined.

As can be observed from the data in Table 2, relative to heterogeneous conventional linear ethylene polymers, extrusion coating compositions comprising substantially linear ethylene polymers allow greater resistance to draw resonance whereby higher extrusion line speeds are attainable. Surprisingly, in contradistinction to Dohrer et al. in U.S. Pat. No. 4,780,264 and to the blends described by Kurtz et al. in U.S. Pat. No. 4,608,221, the substantially linear polymers show higher comparative drawdown rates even at higher melt flow ratios. Table 1 also shows that substantially linear polymers exhibit less neck-in than heterogeneous conventional linear polymers, even at appreciably higher melt indices, and these unique polymers also provide higher extruder pumping rates (as measured as higher specific outputs) which is indicative of more efficient, improved processability.

Samples G–K

Table 3 shows the polymers used (Sample G–K) for an extrusion cast embossed evaluation where the extrusion equipment consists of a three-extruder cast coextrusion film line with a 20/60/20 feedblock design and a slot die. The extruder diameters are 2½, 3½ and 2 inches (6.4, 8.9 and 5.1 cm), respectively, and the die width measures 76 cm with a 20-mil manual die gap. The evaluation involves a primary chill roll with either a chrome polished finish (4–5 rms. surface roughness) or a matte finish (32 rms. surface roughness), and a secondary chill roll with a chrome polished finish (4–5 rms. surface roughness). The line is also equipped with a beta thickness gauge, a nip roll with a silicon-based rubber cover, a squeegee roll and a recirculating water trough system. Table 4 shows the extrusion cast line conditions that are held constant for these polymer evaluations.

TABLE 3

Polymer Descriptions for Extrusion Casting Evaluation

| Sample | Polymer Type | Melt Index (g/10 min.) | Density (g/cc) | Melt Flow Ratio ($I_{10}/I_2$) | Melt Tension (grams) |
|---|---|---|---|---|---|
| G | SLEP | 2.5 | 0.935 | 8.8 | 1.04 |
| H | SLEP | 2.4 | 0.934 | 11.4 | 1.46 |
| I* | LINEAR | 2.4 | 0.934 | 7.4 | 0.65 |
| J* | LINEAR | 4.0 | 0.941 | 6.7 | 0.41 |
| K* | LDPE | 2.0 | 0.922 | 10.5 | 3.8 |

*Not an example of the present invention when used alone.
SLEP = substantially linear ethylene polymer prepared by the interpolymerization of ethylene and 1-octene.
LINEAR = heterogeneous conventional linear low density polyethylene prepared by the interpolymerization of ethylene and 1-octene as described in U.S. Pat. No. 4,076,698 and U.S. Pat. No. 4,780,264.
LDPE = traditional high pressure low density polyethylene.

TABLE 4

Constant Conditions for Extrusion Casting Evaluation

| | |
|---|---|
| Melt Temperature, C. | 274 |
| Nip Roll Height, cm | 29 |
| Draw Gap, cm | 18 |
| Final Film Thickness, mils | 1 |
| Chill Roll Temperature, C. | 21–27 |
| Nip Roll Temperature, C. | 27 |
| Water Bath Temperature, C. | 27–35 |

The onset of extrusion casting draw resonance as defined as maximum drawdown rate is determined by incrementally increasing the line speed (take-off rate) while concurrently increasing the screw speed to maintain a constant film thickness at 1 mil until definitive dimension fluctuations are observed for each polymer. The onset of extrusion cast draw resonance is also indicated by minimum uniform film thickness or maximum downgaugability. Maximum downgaugability is determined by increasing line speed at a constant extrusion output rate for each polymer. Neck-in is determined by measuring the difference between the die width and the width of the web at the primary chill roll. Table 5 illustrates the evaluation results for the onset of draw resonance by both maximum drawdown rate and downgaugability as well as the extrusion output at maximum drawdown for each polymer evaluated. Table 5 also includes results for Inventive Example 12 which is 70/30 weight percent blend of comparative sample J and Inventive Sample H, respectively.

TABLE 5

Extrusion Casting Evaluation

| Example | Sample | Maximum Drawdown Rate (meters/min.) | Maximum Downgaugability † (mils) | Neck-In 91 mpm/1 Mil (cm) | Output at Max Drawdown (kg/hr) |
|---|---|---|---|---|---|
| 7 | G | 174 | 0.82 | 23 | 200 |
| 8 | H | >300 | <0.76 | 20 | >315 |
| 9* | I | 53 | 1.83 | ND | <68 |
| 10* | J | 127 | 1.06 | 27 | 113 |
| 11* | K | >300 | ND | ND | ND |
| 12[a] | L | >152 | ND | ND | ND |

*Not an example of the present invention, provided for comparative purposes only.
† Total extruder output constant at approximately 138 kg/hr.
ND = not determined.
[a]Ample quantities were not available to fully determine maximum drawdown rate and neck-in.

Table 5 shows that the unique substantially linear ethylene polymers of this invention allow significant advantages and/or improvements in drawdown rates, downgaugability, neck-in and output in comparison to heterogeneous conventional linear ethylene polymers. Also, contrary to the disclosure by Dohrer et al. (U.S. Pat. No. 4,780,264), the substantially linear ethylene polymer sample (Sample H) with the highest melt flow ratio and highest melt tension exhibits line speeds comparable to low density polyethylene.

Examples 7-12: Film Properties

Table 6 shows that extrusion casting compositions comprising a substantially linear ethylene polymer allow a superior balance of cast film abuse properties and toughness over low density polyethylene at 1.0 mil film thickness. With few exceptions, Table 6 indicates compositions involving a substantially linear ethylene polymer generally provide at least 30 percent better abuse resistance properties (i.e., yield strength, toughness, tear resistance and dart impact resistance) relative to comparative low density polyethylene cast film. Given the higher density of the substantially linear ethylene polymer compositions (0.934 g/cm$^3$ versus 0.922 g/cm$^3$ for the comparative LDPE sample), the superior abuse resistance and toughness properties are surprising. Ethylene polymers typically show improved mechanical and abuse resistance properties at lower densities. This relationship is especially true for ethylene/α-olefin copolymers where higher comonomer levels provide lower densities and superior toughness. In general, higher density ethylene polymers, and more particularly, medium density (i.e., 0.93 g/cm$^3$–0.945 g/cm$^3$) polymers with 1 percent secant moduli above 30,000 psi (207 MPa), are required in cast embossed applications that demand improved convertibility or machineability, i.e., the ability for the film to move and/or be handled smoothly as it passes from one converting or constructing operation to the next until the final desired product is produced.

TABLE 7

Extrusion Casting Processibility Evaluation

| Example | 7 Inventive Sample G | 8 Inventive Sample H | 9 Comparative* Sample I |
|---|---|---|---|
| Screw Speed (rpm) | | | |
| 6.4 cm Extruder | 15.2 | 16.5 | 15.6 |
| 8.9 cm Extruder | 44.7 | 49.5 | 45.6 |
| 5.1 cm Extruder | 33.4 | 36.8 | 34.2 |
| Extruder Amperage | | | |
| 6.4 cm Extruder | 16 | 14 | 21 |
| 8.9 cm Extruder | 87 | 68 | 108 |
| 5.1 cm Extruder | 12 | 11 | 15 |
| Extruder Pressure (MPa) | | | |
| 6.4 cm Extruder | 11.4 | 9.0 | 15.0 |
| 8.9 cm Extruder | 14.1 | 10.8 | 17.9 |
| 5.1 cm Extruder | 9.2 | 7.5 | 12.8 |

*Not an example of the present invention; provided for comparative purposes only. Constant extrusion conditions: 18 cm air/draw gap, 274 C. melt temperature for all three extruders, 3.4 bars nip pressure, 27 C. nip roll temperature, 21-27 C. chill roll temperature., and 27-35 C. water bath temperature.

As Table 7 shows, compositions of this invention exhibit the significantly lower amperages and extrusion pressures which is indicative of more efficient processibility, i.e., lower energy consumption for the same output.

Examples 13-20

In another evaluation, Inventive Samples A, B and C, as well as two other substantially linear ethylene polymers (Inventive Samples M and N) are tumble dry-blended at a 82/18 ratio with a traditional high pressure low density polyethylene to prepare extrusion coating compositions. The compositions are evaluated for the onset of draw resonance on the Black Clawson extrusion coater described above. The Black Clawson coater is operated substantially as indicated above in Example

TABLE 6

Extrusion Cast Film Property Comparisons

| Example | Sample | Line Speed for 1 mil film (m/min.) | Yield Strength † (MD + TD)/2 (MPa) | Toughness † (MD + TD)/2 MJ/m$^3$ | TD Tear † † Resistance (grams) | Dart Impact † † † (grams) |
|---|---|---|---|---|---|---|
| 7 | G | 91 | 11.2 | 84.4 | 118 | 55 |
| 8 | H | 152 | 10.8 | 62.5 | 198 | 38 |
| 9* | I | 30 | 9.8 | 85.6 | 206 | 66 |
| 10* | J | 91 | 12.7 | 92.2 | 92 | 45 |
| 11* | K (LDPE) | 152 | 7.8 | 60.0 | 124 | 34 |
| 12 | L | 152 | 11.8 | 78.6 | 181 | 45 |

*Not an example of the present invention; provided for comparative purposes only.
Constant extrusion conditions: 18 cm draw gap, 274 C. melt temperature for all three extruders, 3.4 bars nip pressure, 27 C. nip roll temperature, 21-27 C. chill roll temperature, and 27-35 C. water bath temp.
Tensile yield strength and toughness are determined in accordance with ASTM D882 where toughness is taken as the integration of the area under the stress/strain curve.
Elmendorf tear resistance is determined in accordance with ASTM D1922; only transverse direction (TD) resistance is reported since it's most important for cast film applications such as disposable diapers as described by Roberts et al. in ANTEC Proceedings '85, pp. 104-7 and by Lucchesi et al., in Plastics Engineering, May 1985, pp. 87-90, the disclosures of both of which are incorporated herein by reference.
Dart impact is determined in accordance with ASTM D1709 Method A.

Examples 7-9: Extrusion Processability

Another evaluation is conducted to further quantify the superior processability of the unique compositions of the present invention. Inventive samples G and H and comparative sample I, all with similar melt indices and polymer densities, were extrusion casted at a constant output rate (i.e., approximately 138 kg/hour). The corresponding amperages and extrusion pressures for each extruder are listed in Table 7.

1 and Table 8 shows the polymer descriptions for Inventive Sample M and N as well as for the LDPE blend component material. Table 9 shows resultant melt index, drawdown, neck-in and output performance for these various extrusion compositions as well as two additional inventive compositions involving two high pressure ethylene copolymers, i.e., an ethylene-acrylic acid (EAA) copolymer and an ethylene-methyl acrylate (EMA) copolymer. Like the coating operation, the drawdown, neck-in and output determinations are performed substantially as indicated for Examples 1-6.

TABLE 8

| Sample | Polymer Type | Melt Index (g/10 min.) | Density (g/cc) | Melt Flow Ratio ($I_{10}/I_2$) | $M_w/M_n$ |
|---|---|---|---|---|---|
| M | SLEP | 6.7 | 0.903 | 7.4 | 2.12 |
| N | SLEP | 28.0 | 0.898 | 6.3 | 2.23 |
| O* | LDPE | 7.9 | 0.916 | ND | 7.85 |
| P* | LDPE | 4.2 | 0.923 | ND | ND |

*Not an example of the present invention when used alone.
SLEP = substantially linear ethylene polymer prepared by the interpolymerization of ethylene and 1-octene.
LDPE = traditional high pressure low density polyethylene.
ND = not determined.

TABLE 9

| | Extrusion Coating Blend Compositions | | | | |
|---|---|---|---|---|---|
| Example | Base Polymer (Sample #) | High Pressure Ethylene Polymer (18% by wt.) | Melt Index (g/10 min) | Maximum Drawdown (m/min.) | Neck-In 134 mpm/1 Mil (cm) | Output (kg/hr/hp) |
| 1 | A | None | 4.5 | 183 | 21 | 3.2 |
| 13 | A | LDPE | ND | 549 | 9.9 | 3.5 |
| 14 | A | EMA | ND | 305 | 18.5 | 3.4 |
| 15 | A | EAA | ND | 219 | 17.3 | 3.5 |
| 16 | B | LDPE | 4.7 | >610 | 9.9 | 3.8 |
| 17 | C | LDPE | 8.5 | >610 | 9.9 | 4.4 |
| 18 | M | LDPE | 6.4 | >610 | 12.7 | 3.7 |
| 19[a] | N | LDPE | ND | 564 | 10.2 | 4.2 |
| 20* | F | LDPE | 5.4 | 524 | 14.2 | 3.5 |

*Not an example of the present invention; provided for comparative purposes only.
[a]The blend combination of Sample N and sample O (Inventive Example 19) is extruded at a reduced extrusion melt temperature (270 C.) due the high melt index of Inventive Sample N.
EMA = ethylene methyl acrylate copolymer comprised of 20 wt. % methyl acrylate and having a 6 MI.
EAA = ethylene acrylic acid copolymer, supplied by The Dow Chemical Company as PRIMACOR ™ 4608, comprised of 6.5 wt. % acrylic acid and having an 8 MI.
LDPE = Sample O.
ND = not determined.

Table 9 shows blending minor amounts of a highly branched ethylene polymer into a substantially linear ethylene polymer provides extrusion compositions with excellent drawdown performance, lower neck-in and improved specific output. Table 9 also show compositions comprised of the substantially linear ethylene polymers of this invention are superior to comparative linear ethylene polymer compositions, particularly with respect to neck-in at higher drawdown rates. The ability to achieve less neck-in at a higher drawdown rate, not only allows maximum downgaugability, it also provides practitioners the advantage and flexibility to lower the melt index to gain additional strength property improvements.

Example 21-27

In another extrusion coating evaluation, blends are prepared using Inventive Sample M and comparative LDPE sample K as well as another highly branched high pressure LDPE sample (comparative sample P). Descriptions for Inventive Sample M and the LDPE sample P are listed in Table 8. Using these polymers, extrusion coating compositions are prepared dry-blending as described above in Examples 13–20 unless noted otherwise. The compositions are evaluated on the Black Clawson extrusion coater (described above) by increasing the take-off rate at constant screw speed (90 rpms) and deducing the onset of draw resonance. As another part of the evaluation, while being drawn at a constant 440 ft/min. (134 meter/min.), sheets of 0.5 mil oriented polypropylene (OPP) film are slip-sheeted at the die to prepare extrusion laminates for adhesion testing. Table 10 shows the blend composition sample descriptions and extrusion melt temperatures as well as the drawdown, neck-in and OPP adhesion performance for the various compositions evaluated. Inventive Samples 23-27 employ Inventive Sample M.

TABLE 10

| | Additional Extrusion Coating Blend Compositions † | | | | |
|---|---|---|---|---|---|
| Example | Weight % LDPE (Sample O) | Melt Temperature (C.) | Maximum Drawdown (m/min.) | Neck-In at 134 mpm/1 Mil (cm) | OPP Adhesion (g/cm) |
| 21* | 100 | 330 | 268[a] | 4.1 | 14.3 |
| 22* | 100 | 332 | 271[a] | 5.1 | 5.4 |
| 23 | 90 | 329 | 357 | 4.8 | 23.2 |
| 24 | 90 | 328 | 366 | 5.8 | 7.1 |
| 25 | 70 | 317 | 344 | 5.1 | 46.4 |
| 26 | 50 | 318 | 390 | 6.4 | 250 |
| 27 | 18 | 314 | >610 | 12.7 | >286 |

† Black Clawson coextrusion coater line is operated at a screw speed of 90 rpm for ~113 kg/hr.
*Not an example of the present invention; provided for comparative purposes only.
[a]Draw resonance was not observed; maximum drawdown deduced by melt tension breakage manifested as edge tears.
LDPE = Sample P instead of Sample O.

FIG. 1 is a plot showing the maximum drawdown rate as a function of weight percent of a 6.7 Melt Index substantially linear ethylene polymer blended into a 8 Melt Index high pressure low density polyethylene where the blends comprise extrusion compositions. Surprisingly, FIG. 1 together with Table 10 illustrate that these extrusion compositions show synergistic drawdown performance, i.e., the drawdown rates of the combinations are higher than that of either polymer used alone. The synergistic performance and the discovery that the optimum or maximum drawdown performance occurs for compositions comprised of less than about 20 weight percent LDPE into at least one substantially linear polymer, is a contradistinction over the art provided by Kurtz et al. in U.S. Pat. No.

4,339,507 where LDPE blend combinations with a heterogeneous conventional linear ethylene polymer provide synergistic drawdown performance only when the composition is comprised of "greater than 20 weight percent and less than 98 weight percent of a high pressure LDPE" and, according to FIG. 4 provided by Kurtz et al. in U.S. Pat. No. 4,339,507, the optimum amount of LDPE is about 45–50 weight percent for maximum synergistic drawdown performance. Moreover, on a percentage basis (which takes account of extrusion equipment differences), the apparent optimum illustrated in FIG. 1 of this invention represents a more significant drawdown improvement or increase relative to the disclosed discoveries of Kurtz et al. Further, Table 10 also shows that the present inventive compositions provide exceptional and/or synergistic OPP adhesion when extrusion laminated or the like.

Examples 28-39: Ternary Polymer Blends

In the same manner as described for Examples 21-27, ternary blends are prepared using a substantially linear ethylene polymer, a linear ethylene polymer and a high pressure low density polyethylene polymer. The various blend combinations of these polymers is reported in Table 11. As dry-blended extrusion coating compositions, the polymer blends are evaluated on the Black Clawson extrusion as described in Example 5 to determine drawdown and neck-in performance. Resultant paper coatings and uncoated Kraft paper are also evaluated for tear resistance using the Elmendorf Tear method in accordance with ASTM D1938. The neck-in, drawdown rate before the onset of draw resonance and tear properties as well as polymer descriptions are all reported in Table 11.

Figure 2:
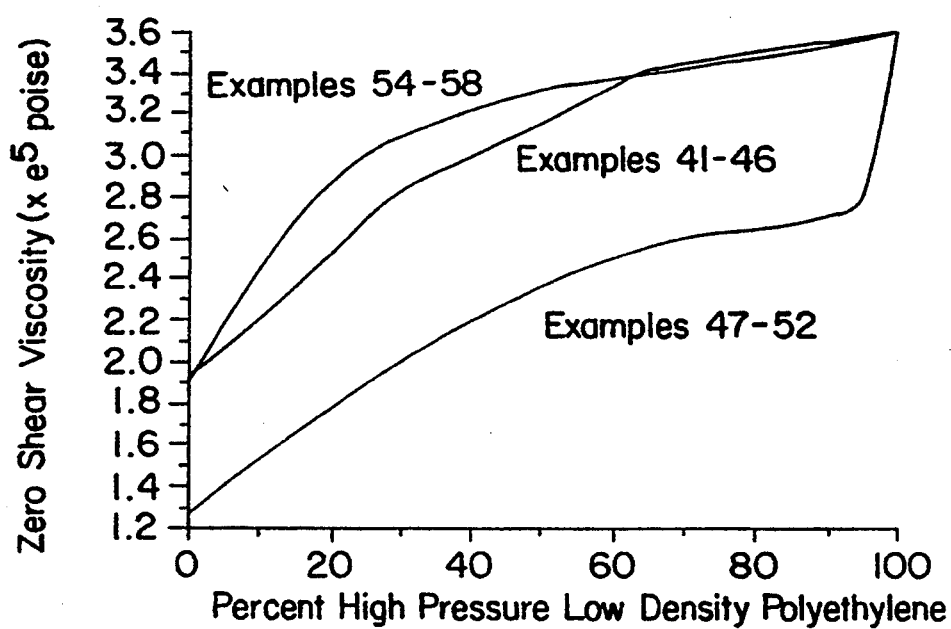
FIG. 2 is a plot of the zero shear melt viscosity as a function of weight percent high pressure low density polyethylene for two blends comprising substantially linear ethylene polymers with a high pressure low density polyethylene polymer and one blend comprising a conventional heterogeneous linear low density polyethylene polymer with a high pressure low density polyethylene polymer.

FIG. 2: Melt Elasticity

In another experiment, the relative melt tension or melt elasticity of inventive blends and heterogeneous conventional blend compositions is determined. The experiment involved two substantially linear ethylene polymers, one heterogeneous linear low density polyethylene and one high pressure low density polyethylene. The property descriptions of these raw materials are listed in Table 12. Melt blends of the substantially linear ethylene polymers with LDPE and a blend of LLDPE with LDPE were prepared by melt mixing the components in a Haake Rheocorder mixer at a 160 C. melt temperature and 40–60 rpm rotor speed for a total of five minutes. The resultant blends are granulated and compression molded into 3 mm thick plates for melt elasticity testing. The pure components (base polymers) are also subjected to identical Haake mixer treatment. The melt index ($I_2$) and melt tension are determined for the resultant blends and pure components as described above. The melt elasticity is determined by using a Rheometrics Dynamic Analyzer II where the dynamic shear viscosity experiment is performed from 0.05 Hz to 100 Hz under 15% strain at 160 C. and the melt viscosity at zero shear rate is interpolated from the resultant plot. Table 13 shows the melt index, melt tension and zero shear viscosity for the three polymer blends. FIG. 2 is a plot of zero shear melt viscosity as a function of weight percent high pressure low density polyethylene in the blend. These data show that polymer blends involving a substantially linear ethylene homopolymer and copolymer exhibit synergistic melt elasticity behav-

TABLE 11

Ternary Polymer Blends

| Example | LDPE (wt. %) | ULDPE (wt. %) | SLEP (wt. %) | Neck-In 134 mpm/1 Mil (cm) | Maximum Drawdown (m/min.) | Tear Resistance (grams) † |
|---|---|---|---|---|---|---|
| 28* | 100 | 0 | 0 | 5.5 | 305 | 121 |
| 29* | 20 | 80 | 0 | 10.9 | >610 | 275 |
| 30* | 80 | 20 | 0 | 4.8 | 380 | 134 |
| 31 | 80 | 0 | 20 | 4.8 | 450 | 134 |
| 32 | 20 | 0 | 80 | 10.9 | >610 | 290 |
| 33 | 20 | 70 | 10 | 11.4 | >610 | 253 |
| 34 | 20 | 50 | 30 | 11.7 | >610 | 287 |
| 35 | 20 | 30 | 50 | 11.4 | >610 | 276 |
| 36 | 70 | 20 | 10 | 5.3 | 405 | 155 |
| 37 | 50 | 20 | 30 | 6.1 | 415 | 298 |
| 38 | 30 | 20 | 50 | 8.4 | >610 | 252 |
| 39[b] | 0 | 0 | 0 | NA | NA | 92 |

*Not an example of the present invention; used for comparative purposes only.
SLEP = substantially linear ethylene polymer prepared by the interpolymerization of ethylene and 1-octene having a 8.1 Melt Index and a 0.913 g/cc density.
LDPE = traditional high pressure low density polyethylene; Comparative Sample O.
ULDPE = heterogeneous conventional ultra low linear low density olefin polymer of ethylene and 1-octene having a 6.0 Melt Index and a 0.911 g/cc density.
NA = not applicable.
† Tear resistance values are reported as (machine direction + transverse direction)/2.
[b]Sample 39 is uncoated Kraft paper and is not an example of the present invention.

Table 11 shows that the ternary combination of substantially linear ethylene polymers with high pressure polyethylene and linear ethylene polymers can allow improved drawdown rates and improved tear properties in comparison to high pressure polyethylene used alone in an extrusion coating operation. Also, Table 11 shows that ternary blend compositions based on substantially linear ethylene polymers offer better overall performance attributes with respect to neck-in, drawdown and tear properties when compared to known blend combinations involving high pressure polyethylene and heterogeneous conventional linear ethylene polymers.

ior (opposed to linear or directly additive behavior) as measured by zero shear viscosity which represents the unperturbed chain entanglement capability. Higher zero shear viscosity and chain entanglement capability, which is the origin of melt strength, is thought to relate directly with long chain branching and allows for the build up of melt stress during high shear drawing at high line speeds.

TABLE 12

Polymer Blend Raw Materials

| Sample | Polymer Type | Melt Index, $I_2$ (g/10 min) | Density (g/cc) | Melt Tension (grams) | $I_{10}I_2$ |
| --- | --- | --- | --- | --- | --- |
| Q | SLEP | 1.03 | 0.9192 | 1.9 | 9.4 |
| R | SLEP† | 0.97 | 0.9512 | 3.0 | 12.1 |
| S* | LINEAR | 1.0 | 0.920 | 1.2 | 8.0 |
| T* | LDPE | 0.7 | 0.923 | 9.8 | 9.8 |

*Not an example of the present invention when used alone.
SLEP = substantially linear ethylene polymer prepared by the interpolymerization of ethylene with 1-octene.
SLEP = substantially linear ethylene polymer prepared by the homopolymerization of ethylene.
LDPE = traditional high pressure low density polyethylene.
LINEAR = heterogeneously linear low density polyethylene prepared by the interpolymerization of ethylene with 1-octene; supplied by The Dow Chemical Company under the trademark of DOWLEX ™ 2045.
ND = not determined.

TABLE 13

Melt Elasticity of Haake-Mixed Polymer Blends

| Example | Base Polymer (Sample #) | % LDPE (Sample T) | Melt Index (g/10 min.) | Melt Tension (grams) | Zero Shear Viscosity (X $e^5$ poise) |
| --- | --- | --- | --- | --- | --- |
| 40* | T | 100 | 14.08 | 12.63 | 3.6 |
| 41 | Q | 80 | 13.08 | 11.56 | 3.5 |
| 42 | Q | 65 | 12.19 | 11.45 | 3.41 |
| 43 | Q | 50 | 10.54 | 10.93 | 3.15 |
| 44 | Q | 30 | 3.89 | 10.24 | 2.83 |
| 45 | Q | 10 | 2.36 | 9.71 | 2.2 |
| 46 | Q | 0 | 3.65 | 9.21 | 1.93 |
| 47* | T | 100 | ND | ND | 3.6 |
| 48* | S | 95 | ND | ND | 2.76 |
| 49* | S | 85 | ND | ND | 2.66 |
| 50* | S | 70 | ND | ND | 2.6 |
| 51* | S | 30 | ND | ND | 1.99 |
| 52* | S | 0 | ND | ND | 1.26 |
| 53* | T | 100 | 13.79 | 11.8 | 3.6 |
| 54 | R | 90 | 16.96 | 13.34 | 3.52 |
| 55 | R | 80 | 14.65 | 13.33 | 3.47 |
| 56 | R | 50 | 11.11 | 13.13 | 3.31 |
| 57 | R | 20 | 6.74 | 14.13 | 2.87 |
| 58 | R | 0 | 3.01 | 13.01 | 1.9 |

*Not an example of the present invention; provided for comparative purposes.
ND = not determined.

Examples 59–65: Molecular Interrelationships

In another extrusion coating evaluation, draw ratio is approximated from web thicknesses. The molecular interrelationship between melt index, melt tension and maximum draw ratio before the onset of draw resonance is elucidated by performing standard least squares regression analysis on the dataset shown in Table 14. The following equation shows the interrelationship:

$$\text{Critical Draw Ratio} = a * MT - b * MI - c * MT^2 + d * MI^2 + e * MT * MI$$

where, a is a coefficient from about 39 to about 60, and especially from about 45 to about 53;

b is a coefficient from about 7 to about 11, and especially from about 8 to about 10.5;

c is a coefficient from about 33 to about 46, and especially from about 36 to about 43;

d is a coefficient from about 0.5 to about 0.9, and especially from about 0.55 to about 0.85;

e is a coefficient from about 13 to about 24, and especially from about 16 to about 21;

MT is Melt Tension determined at 190 C. as described above; and

MI is Melt Index determined in accordance with ASTM D1238 Condition 190 C./2.16 kg.

TABLE 14

Molecular Interrelationships

| Example | Blend Component(s) | Component Weight % | Melt Index (g/10 min) | Melt Tension (grams) | Draw Ratio |
| --- | --- | --- | --- | --- | --- |
| 59 | Sample A | 100 | 4.5 | 0.46 | 28 |
| 60 | Sample B | 100 | 4.7 | 0.53 | 31 |
| 61 | Sample C | 100 | 9.4 | 0.28 | 35 |
| 62* | Sample O | 100 | 7.9 | 4.48 | 49 |
| 63 | Sample A/O | 90/10 | 4.9 | 0.88 | 65 |
| 64 | Sample B/O | 90/10 | 4.45 | 0.91 | 61 |
| 65 | Sample A/O | 70/30 | 4.8 | 1.9 | 92 |

*Not an example of the present invention when used alone.

We claim:

1. In a process for extrusion coating a substrate or for making a cast film with a thermoplastic composition, comprising the steps of:

(i) feeding a thermoplastic composition into at least one extruder, (ii) melting and mixing the thermoplastic composition to form at least one uniform molten polymer stream, and (iii) extruding the molten polymer stream through a die to form a primary web, the improvement comprising:

(i) operating said extruder at line speeds greater than 152 meters/minute, and either (a) drawing down said web onto said substrate to thereby coat said substrate with at least one layer of said thermoplastic composition, or (b) cooling and drawing down said web onto a take-off device to make said film with at least one layer of said thermoplastic composition, (ii) conveying or collecting said coated substrate or said film for subsequent use, and (iii) using as said thermoplastic composition:

(I) from about 10 to 100 percent by weight of at least one substantially linear ethylene polymer characterized as having:

(a) a melt flow ratio, $I_{10}/I_2, \geq 5.63$, (b) a molecular weight distribution, $M_w/M_n$, defined by the equation: $M_w/M_n \leq (I_{10}/I_2) - 4.63$, (c) a critical shear rate at the onset of surface melt fracture of at least 50 percent greater than the critical shear rate at the onset of surface melt fracture of a linear olefin polymer having about the same $I_2$ and $M_w/M_n$, and (d) a single melting peak as determined using differential scanning calorimetry; and (II) from 0 to about 90 percent by weight of at least one polymer selected from the group consisting of a heterogeneous linear ethylene polymer and high pressure ethylene polymer.

2. The process defined in claim 1 wherein (I) is an ethylene homopolymer.

3. The process defined in claim 1 wherein (I) is an interpolymer of ethylene and at least one $C_3$-$C_{20}$ α-olefin.

4. The process defined in claim I wherein (I) is a copolymer of ethylene and one $C_3$-$C_{20}$ α-olefin.

5. The process defined in claim 1 wherein (I) is a terpolymer of ethylene and two $C_3$-$C_{20}$ α-olefins.

6. The process defined in claim I wherein the Dow Rheology Index (DRI) of (I) is at least 0.1.

7. The process defined in claim 1 wherein (I) has a melt index, $I_2$, from about 1 grams/10 minutes to about 10 grams/10 minutes, a density from about 0.9 grams/cm$^3$ to about 0.94 grams/cm$^3$, a molecular weight distribution, $M_w/M_n$, from about 1.5 to about 6.5, a melt flow ratio, $I_{10}/I_2$, of about 8 to about 12, a DRI of at least 0.1, and a draw ratio of at least about 18.

8. The process defined in claim 1 wherein (II) is an interpolymer of ethylene and at least one $C_3$-$C_{20}$ α-olefin.

9. The process defined in claim 1 wherein (II) is a copolymer of ethylene and one $C_3$-$C_{20}$ α-olefin.

10. The process defined in claim 1 wherein (II) is linear low density polyethylene.

11. The process defined in claim 1 wherein (II) is ultra low density polyethylene.

12. The process defined in claim 1 wherein (II) is low density polyethylene.

13. The process defined in claim 1 wherein (II) is an interpolymer of ethylene and at least one α,β-ethylenically unsaturated comonomer.

14. The process defined in claim 1 wherein (II) is a copolymer of ethylene and one α,β-ethylenically unsaturated comonomer.

15. The process defined in claim 1 wherein (II) is a copolymer of ethylene with acrylic acid.

16. The process defined in claim 1 wherein (II) is a copolymer ethylene with methyl acrylate.

17. The process defined in claim 1 wherein (II) is at least one high pressure ethylene polymer.

18. The process defined in claim 1 wherein (II) is at least one linear ethylene polymer.

19. The process defined in claim 1 wherein said composition is a ternary blend comprising at least one substantially linear ethylene polymer and at least one high pressure ethylene polymer and at least one linear ethylene polymer.

* * * * *